Dec. 12, 1967 T. A. FIRESTONE 3,357,690
SQUARE SHEARING DEVICE
Filed May 4, 1964
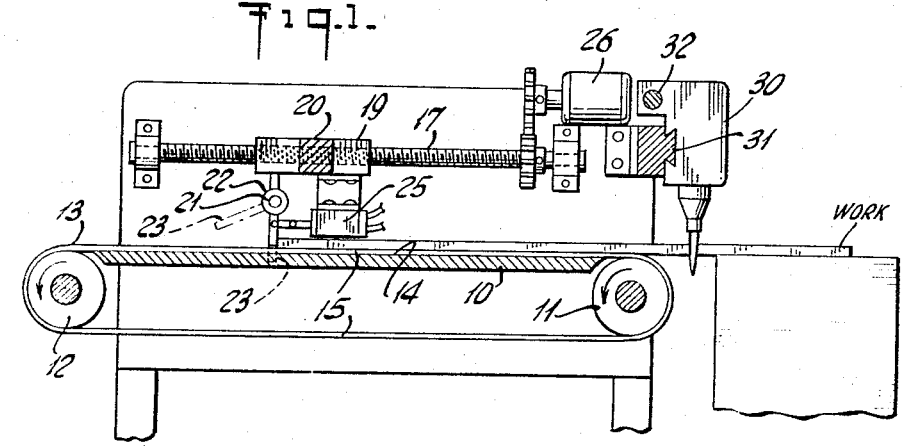
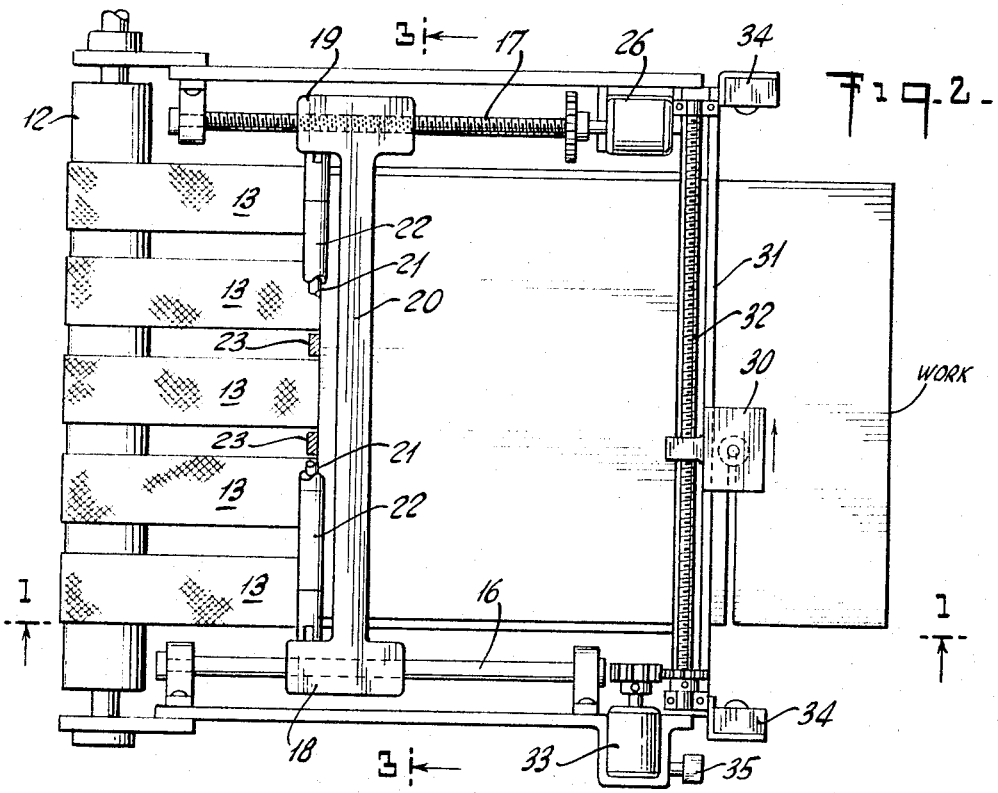
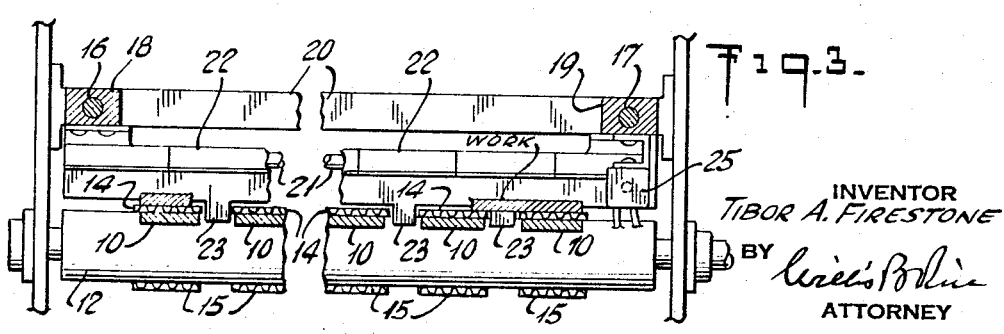
INVENTOR
TIBOR A. FIRESTONE
BY
ATTORNEY 3,357,690
SQUARE SHEARING DEVICE
Tibor A. Firestone, 1270 5th Ave.,
New York, N.Y. 10029
Filed May 4, 1964, Ser. No. 364,631
4 Claims. (Cl. 266—23)

This invention comprises a machine for cutting a strip, sheet or plate of metal to a pre-determined length, with accuracy and with a minimum of labor, known in the industry as squaring shears.

It is an object of this invention to provide a device by which a sheet or plate of metal is moved accurately to the cutting position by conveyors in such a manner that the individual sections are exactly positioned, and are cut to an accurate size without the need of individual measurement or handling.

The machine has its frame so constructed that a sheet or plate of metal may be easily brought to rest against a pre-set stop and then may be quickly and accurately cut along a pre-determined line, and thereafter the cut off piece may be carried through the device and delivered to be piled in a pile, or carried away, as desired, while another sheet or plate is being moved up to cutting position.

The conventional squaring shears are built in various sizes for various capacities. To shear through a light metal relatively small force is needed compared to cutting ¼″, ½″ or 1″ plate. As the thickness of the metal to be cut increases, not only the frame work and the cutting force of shear has to be increased in tremendous proportions, but also the foundation work for the shear has to be built deeper and stronger to withstand up to 50 tons and more of impact force. Using a shear in accordance with this invention the necessity of all this will be eliminated, as we do not have to consider impact reaction any more. The shear table will have to be built just strong enough to carry only the dead weight of the material to be cut.

The conventional shears are equipped with a set of knives. One knife is stationary, the other moves up and down in shearing action. The back-gauge angle and outrigger arms in most cases are directly or indirectly connected with the moving knife and move with it up and down. This up and down movement of the knife and back-gauge angle prevent placing a solid type support under the material to be cut (the overhanging part of material between the knife and back-gauge angle) thus the support for the material against flexing has to go also up and down with the knife and gauge angle, or else no support may be provided against flexing.

With the high intensity cutter equipped shear the necessity of an up and down moving support table is also eliminated and a fixed, even height with shear table, conveyor may be incorporated into the shear design, simplifying not only the continuous conveying of cut material (no more accumulation) but the stacking as well.

The device is shown in the accompanying drawings, in which FIG. 1 is a vertical section through the machine, transverse to the cutting edge; FIG. 2 is a top plan view, and FIG. 3 is a section along the line 3—3 of FIG. 2.

In the drawing the device comprises a table 10 having a roller 11 journalled in its front edge, and a similar roller 12 at its back edge, and over these rollers there is carried a series of spaced parallel belts or chains 13, the upper stretch 14 of which rests upon the face of the table 10, while the lower stretch 15 of the belts 13 returns below the table top.

Mounted on the opposite sides of the table 10 and above the upper stretch 14 of the belts is a pair of control rods 16 and 17, the outer surface of rod 16 is smooth and a sleeve 18 slides upon it, while the rod 17 is screw threaded into a threaded sleeve 19. These two sleeves are connected rigidly by a cross bar 20 so that by rotating rod 17, the cross bar 20 may be moved over the sheet or plate, always parallel to the front edge of the table.

Attached to the sleeves 18 and 19 is journalled a cross shaft 21 parallel to the cross bar 20 and on this shaft 21 there is journalled a sleeve 22 carrying a plurality of stop fingers 23 adapted to extend down between the belts 13, so that when the sleeve 22 is turned to hold the fingers 23 downwardly, they serve as stops to limit the movement of the sheet or plate as it is carried into the machine, to hold it while the cutting takes place.

This sleeve 22, however, may be turned by a magnetic control switch 25 which, at a proper time will rotate sleeve 22 to raise the stops 23 above the sheet or plate, and at the same time start the belts in motion whereby the cut sheet or plate passes beneath the stops and out of the machine. The length of the cut sheet is determined by a motor 26 which may be rotated to move the cross bar 20 to the desired position.

The cutting torch, which may be of any form of high intensity cutter, such as a high energy stream of particles or radiation, as a laser beam cutter, a gas flame cutter, or a high intensity plasma jet cutter, is mounted on a track 31, parallel to and above the cutting line of the sheet or plate, and it is moved by a screw 32 parallel to the track. The phrase any form of high intensity cutter used above includes any high intensity cutter, such as a laser cutter, plasma jet cutter or gas flame cutter. This screw 32 is turned by a hand controlled reversible motor 33 and at the end of each stroke the motor connection is automatically reversed by a reversing device 34 so that the cutter moves forward and back on successive operations.

In using the device the end of the sheet or plate to be cut is placed upon the belts 13 and the motor turned on, the end of the sheet or plate will then be moved by the belts until it encounters the stops 23. These stops actuate the magnetic control device 25, stopping the belts and the sheet or plate, and conditioning the cutter for further operation.

The operator then closes the cutter control switch 35, starting the screw 32 and moving the high energy stream cutter across the sheet or plate from whichever side it is on and cutting off one side. When the sheet is severed the high energy stream cutter reaches the end of its travel it reverses its own circuit for the next cutting. When the cutting is completed the operate actuates the magnetic control device, which raises the stops 23 and start the belts 13 in operation, carrying the cut off sheet or plate out of the machine and feeds a new sheet or plate into it. But when the cut off sheet or plate passes out of the machine the stops 23 are dropped into position so that when the new sheet encounters the stops the belts are stopped until the next cutting is complete. While the cut sheet is being fed out of the machine, the end of the metal of the metal supply sheet or plate may be brought onto the moving belts so that it may be fed up in turn to engage the stops 23.

What I claim is:
1. An apparatus for cutting end pieces successively from lengths of flat metal material of varying widths and thicknesses, comprising supporting means for a length of said material including a plurality of laterally spaced, parallel, movable belts on which the end portion of said length rests for longitudinal movement, releasable stop means having rigid stop elements extending between said belts along a line intermediate the ends for engagement by the end edge of said length of metal material to limit longitudinal movement of said material, said stop means including means to stop movement of said belts, cutting means comprising a high energy stream cutter movable in opposite directions in a line transversely of said length spaced from and parallel to the line of said stop means to sever the end portion from the remainder without the exertion of mechanical force so that said stop means and said cutting means form a fixed length of an end piece on each operation, means to release said stop means and start said conveyor after each cutting operation so that said conveying means moves the severed piece beyond said stop means and the new end edge of said length moves into engagement with said stop means, and said cutting means severs a new end portion on transverse movement in the opposite direction.

2. The apparatus claimed in claim 1, in which said stop means are adjustable longitudinally of said belts to provide different lengths of severed end pieces.

3. The apparatus claimed in claim 1, in which said high energy stream cutter is a plasma jet cutter.

4. The apparatus claimed in claim 1, in which control means reverse the travel of said cutting means upon engagement of the new end edge of the length with said stop means.

References Cited

UNITED STATES PATENTS

| | | | |
|---|---|---|---|
| 2,922,869 | 1/1960 | Giannini | 219—75 |
| 2,979,978 | 4/1961 | Hasselquist | 83—209 |
| 3,141,367 | 7/1964 | Keener | 266—23 X |

OTHER REFERENCES

Flame Cutting Structural Shapes in Quantity, July 21, 1947, vol. 121, Steel, No. 3, pp. 100 and 101.

CHARLIE T. MOON, *Primary Examiner.*

R. F. DROPKIN, *Assistant Examiner.*